(12) United States Patent
Carlson

(10) Patent No.: US 11,674,757 B1
(45) Date of Patent: Jun. 13, 2023

(54) DIRECT CONTACT PARTICLE-FLUID HEAT EXCHANGER

(71) Applicant: National Technology & Engineering Solutions of Sandia, LLC, Albuquerque, NM (US)

(72) Inventor: Matthew D. Carlson, Eau Claire, WI (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 82 days.

(21) Appl. No.: 17/348,670

(22) Filed: Jun. 15, 2021

Related U.S. Application Data

(60) Provisional application No. 63/039,703, filed on Jun. 16, 2020.

(51) Int. Cl.
| | | |
|---|---|---|
| *F28C 3/16* | (2006.01) | |
| *F28F 27/00* | (2006.01) | |
| *F28D 19/02* | (2006.01) | |

(52) U.S. Cl.
CPC ............... *F28C 3/16* (2013.01); *F28D 19/02* (2013.01); *F28F 27/006* (2013.01)

(58) Field of Classification Search
CPC .... F28C 3/16; F28C 3/005; F28C 3/18; F28F 27/006; F28D 17/005; F28D 19/02
USPC ........................................................... 165/7
See application file for complete search history.

(56) References Cited

U.S. PATENT DOCUMENTS

| | | | | |
|---|---|---|---|---|
| 3,512,764 A | * | 5/1970 | Jensen | F27B 7/40 34/127 |
| 3,809,528 A | * | 5/1974 | Kramm | F27B 7/40 432/118 |
| 4,146,975 A | * | 4/1979 | Duhem | F26B 11/0418 432/106 |
| 4,191,530 A | * | 3/1980 | Bearce | F26B 11/028 432/112 |
| 5,044,424 A | * | 9/1991 | Monro | F23L 15/04 165/5 |
| 2021/0048254 A1 | * | 2/2021 | Yoshida | F28D 11/04 |

\* cited by examiner

*Primary Examiner* — Jon T. Schermerhorn, Jr.
(74) *Attorney, Agent, or Firm* — Daniel J. Jenkins

(57) ABSTRACT

The present disclosure is directed to systems and methods that transfer heat directly from hot particles to a cold fluid, such as $sCO_2$, by bringing the hot particles and cold fluid into direct contact at the operating pressure of the cold fluid. These systems and methods can both stand-off large pressure differentials while allowing particles to pass through and limiting cold fluid leakage either continuously or through a batch process.

16 Claims, 3 Drawing Sheets

DIRECT CONTACT PARTICLE-FLUID HEAT EXCHANGER

CROSS-REFERENCE TO RELATED APPLICATIONS

This application claims priority to U.S. Provisional Patent Application No. 63/039,703, filed Jun. 16, 2020, titled "DIRECT CONTACT PARTICLE-FLUID HEAT EXCHANGER," all of which is incorporated herein by reference in its entirety.

STATEMENT OF GOVERNMENT INTEREST

The United States Government has rights in this invention pursuant to Contract No. DE-NA0003525 between the United State Department of Energy and National Technology & Engineering Solutions of Sandia, LLC, both for the operation of the Sandia National Laboratories.

FIELD

The present disclosure is generally directed to heat exchange, and more particularly to systems and methods for transferring heat from hot particles to a fluid.

BACKGROUND

Current heat exchanger technologies utilizing particles use a conventional two-fluid geometry where one fluid, the moving particles, flow in ambient pressure on one side of a heat transfer plate while the other fluid, the high pressure sCO2, flows inside the heat transfer plate in as close to a counterflow configuration as possible. This geometry requires that heat pass through the pressure boundary from the particles to the sCO2 and therefore requires the pressure boundary material to contain high pressures at simultaneously high temperatures. This arrangement requires high tensile strength at temperature and therefore requires advanced metal alloys which limit the achievable operating temperature of the heat exchanger to something well below the capabilities of either the particle or sCO2 separately. In addition, heat transfer from a slowly moving particle flow or 'moving packed bed' is very poor as it is dominated by conduction through the solid particles and the contact area between the particles and the heat transfer plate and between each particle is limited by the spherical geometry of the particle required to allow them to flow.

What is needed are heat exchange system and methods that overcome these and other deficiencies by improving the heat transfer between high temperature particles and a cold fluid.

SUMMARY OF THE DISCLOSURE

The present disclosure is directed to a heat exchange system including a pressure vessel comprising a particle inlet, a particle outlet, a fluid inlet and a fluid outlet, and a control system configured to open the particle inlet to receive particles at a first particle temperature while the fluid inlet and outlets are closed. The control system is configured to introduce a fluid at a first fluid temperature into the pressure vessel containing the particles at the first particle temperature thereby heating the fluid via direct contact with the particles to a second temperature and pressurizing the pressure vessel and reducing the particle temperature to a second particle temperature, and to then discharge the fluid at the second fluid temperature via the fluid outlet, and discharging the particles from the pressure vessel. The first particle temperature is greater than the second particle temperature. The first fluid temperature is less than the second fluid temperature.

The present disclosure is further directed to a method that includes feeding particles having a particle inlet temperature into a pressure vessel, feeding a fluid at a fluid inlet temperature into the pressure vessel at a temperature less than that of the heated particles, directly contacting the heated particles and the fluid, discharging the fluid from the pressure vessel at a fluid discharge temperature greater than the fluid inlet temperature, and discharging the particles at a particle outlet temperature less than the particle inlet temperature from the pressure vessel.

An advantage of the present disclosure is improved heat transfer resulting from direct contact between hot particles and a cold fluid.

Another advantage of the present disclosure is a heat exchanger that does not require a high pressure barrier between the counter-flowing fluids.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The present disclosure is directed to systems and methods that transfer heat directly from hot particles to a cold fluid by bringing the hot particles and cold fluid into direct contact at the operating pressure of the cold fluid. The cold fluid may be a liquid, gas or combination thereof. In an embodiment, the cold fluid may be a supercritical fluid, such as, but not limited to supercritical carbon dioxide ($sCO_2$). These systems and methods can both stand-off pressure differentials up to 300 bar while allowing particles to pass through and limiting cold fluid leakage either continuously or through a batch process.

The present disclosure is further directed to a heat exchanger that includes a vessel for receiving hot particles at ambient pressure. The vessel is configured to further receive a cold fluid that mixes with the hot particles and that pressurizes the vessel from the heating of the cold fluid. The vessel is further configured to discharge the high pressure, hot fluid.

The present disclosure is further directed to a heat exchanger that includes a vessel for receiving a flow of hot particles, an inlet for suppling a fluid into the vessel to mix with the hot particles, and an outlet for discharging the fluid from the vessel once the fluid has been heated by the particles.

The present disclosure is further directed to a method including contacting and mixing a cold fluid with hot particles that pressurize a vessel and creates a hot fluid, and further discharging the hot fluid at a high pressure.

Figure 1:
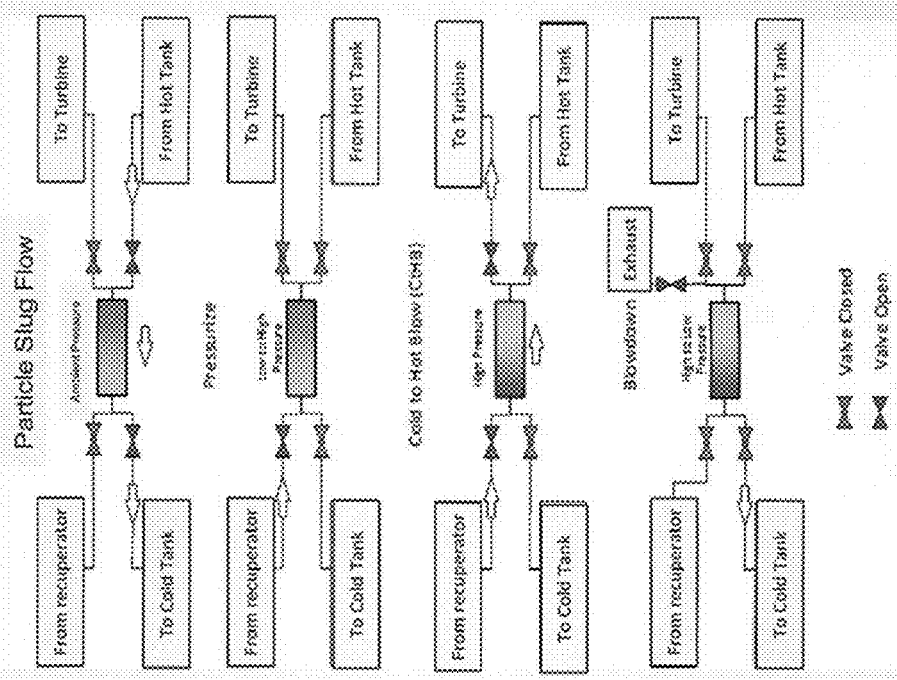
FIG. 1 illustrates a heat exchange methodology and system according to an embodiment of the disclosure.

FIG. 1 illustrates a system and process according to an embodiment of the disclosure. As can be seen in FIG. 1, this embodiment includes 4 stages or steps.

1. The pressure vessel or heat exchanger has a particle inlet for receiving hot particles at ambient or low pressure from a hot reservoir or tank. The particles are a high temperature material, such as a metal or ceramic. In an embodiment, the ceramic may be an oxide or nitride, such as, but not limited to silica or silicon nitride. In an embodiment, the particles may be sand. In an embodiment, the particles may be porous. The particle outlet for discharging cooled or warm particles from the heat exchanger is open to allow for cooled particles from a previous cycle to be removed by the flow of the introduced hot particles pushing the cooled particles out of the heat exchanger. In other embodiments, the warm particles may move thorough the heat exchanger on a packed moving bed that is forced by the introduction of particles at the inlet and/or may be removed by a conveyance system, such as by a conveyor. In an embodiment, the heat exchanger may be moving packed bed reactor. In other embodiments, the heat exchanger may be empty of particles and the particle outlet may be closed as the hot particles are introduced. In an embodiment, the particles are heated by a concentrated solar tower and are thereby recirculated between the heat exchanger and concentrated solar tower. A fluid inlet and a fluid outlet for receiving a cold fluid and discharging a hot fluid, respectively, are closed.

2. A cold fluid, such as shown in this example as cold $sCO_2$, is introduced into the heat exchanger via the fluid inlet and heated by the hot particles. In other embodiments, the fluid may be, but is not limited to a gas or liquid, such as air or water. In this exemplary embodiment, the cold fluid is provided from a recuperator. In other embodiments, the cold fluid may be provided from a holding tank, heat exchanger or other cold fluid source. The fluid outlet and particle inlet and outlets are closed to allow the heating fluid to pressurize the heat exchanger.

3. Additional cold fluid is introduced into the heat exchanger via the fluid inlet and heated fluid is discharged via the fluid outlet. In this exemplary embodiment, the hot fluid is provided to and drives a turbine. In other embodiments, the hot fluid may be provided to a storage unit, heat exchanger or other device for utilizing the hot fluid. In this manner, the cold fluid extract heat from the hot particles until a predetermined temperature decrease is observed in the discharged warm particles, discharged hot fluid or both.

4. When a predetermined amount of heat is exchanged between the hot particles and cold fluid, the particle inlet and outlet and the fluid inlet and outlet are closed and any residual heated fluid is discharged and the heat exchanger is depressurized via a blowdown valve in fluid connectivity with the heat exchanger. This allows the particle inlet and outlet valves to be opened without a pressure surge.

This cycle is repeated.

In other embodiments, alternatively or in addition to using valves to stand off the high pressure differential between the particles and the sCO2, the pressure drop of the particles can be used to restrict sCO2 leakage in part or entirely depending on flow distance required through the heat exchanger, for example when the heat exchanger is a moving packed bed. In an embodiment of this configuration, a tall moving packed bed of particulate would continuously flow particles through a thick-walled high temperature duct. In an embodiment, the packed bed may be on the order of 2 m to 6 m high. In an embodiment, the packed bed may be 3.5 m high. sCO2 would be injected within "active region near the center of the duct, flow up the duct through the particulate as it's heated by the particulate, and be collected above the injection point. An amount of particulate may be maintained above and below this active region to provide a sufficient pressure drop so as to limit the leakage of sCO2 in either direction to an acceptable level without requiring any physical sealing mechanism. The duct requires enough tensile strength to contain the high pressure in the active region, but this region could be internally insulated so that the material reacting the tensile load could be much cooler than and not necessarily compatible with the sCO2 allowing inexpensive carbon steel to be used for this pressure boundary rather than high alloy stainless steels or nickel alloys.

Figure 2:
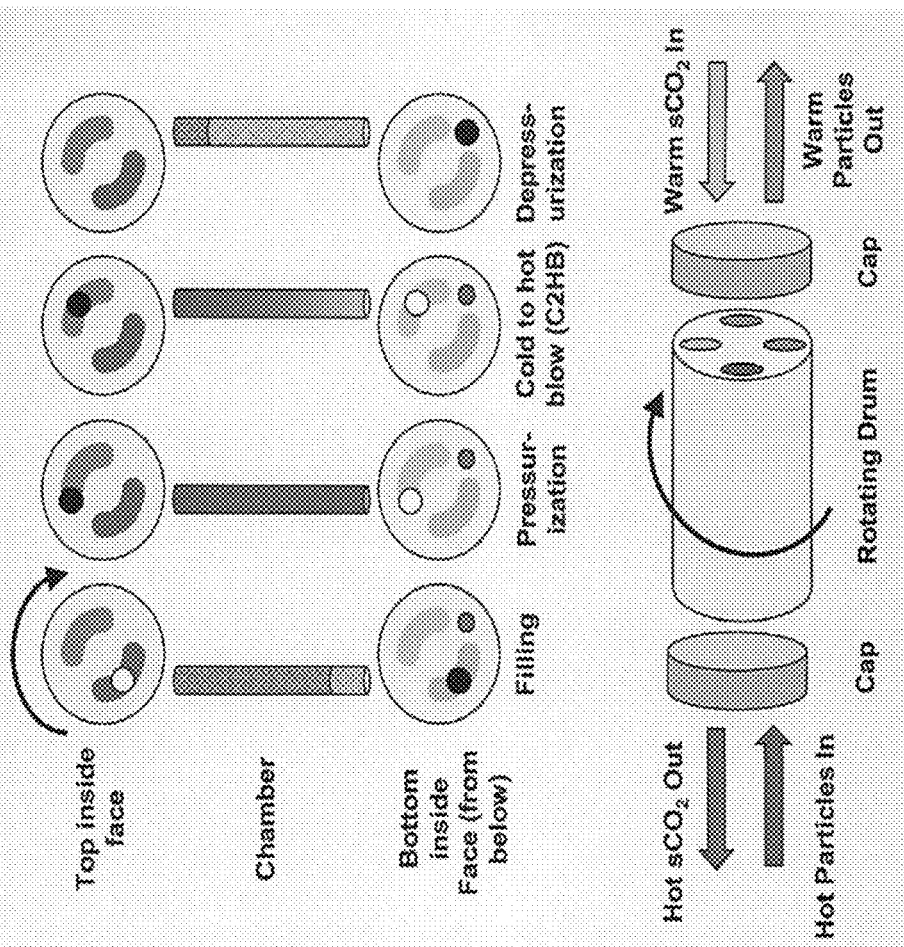
FIG. 2 illustrates another embodiment of a heat exchange system and method according to an embodiment of the disclosure.

FIG. 2 illustrates another system and process according to an embodiment of the disclosure. In this exemplary embodiment showing an exemplary application using $sCO_2$, the heat exchanger is a moving packed bed regenerator that includes a rotating cylinder or drum and end caps that form a pressure vessel when inlets and outlets in the end caps are not aligned with inlet and outlets in the drum. The inlets and outlets in the drum provide feed and discharge to two void or internal spaces within the drum that allows the particles and fluid be fed, mixed and discharged. In FIG. 2, the hot particle inlet and the hot $sCO_2$ outlet would be positioned above the warm particle outlet and warm $sCO_2$ inlet (note the figure illustrates the drum on its side but would be vertical in application). In operation, the drum's central cylindrical axis would be vertical so the particles travel through the drum by gravity. As can be seen in FIG. 2, rather than using a series of valves and chambers as shown in the embodiment illustrated in FIG. 1, the method and system of the embodiment illustrated in FIG. 2 uses a rotary film seal equivalent to a valve and rotating chambers. As can further be seen in FIG. 2, the methodology includes 4 steps, including filing the chamber with hot particles, pressurizing the chamber from the heating of an introduced cold fluid, discharging the hot fluid while extracting further heat from the hot particles, and de-pressuring the vessel via a blowdown such as a screened discharge hole.

In FIG. 2 the top half of the figure illustrates the positioning of the end caps and the openings thereof. The end caps remain stationary as the drum rotates allowing for intermittent alignment of the cap and drum inlets and outlets to allow feed and discharge of the particles and fluid in the sequence as described above regarding the embodiment shown in FIG. 1. In another embodiment, the drum remains stationary and the endcaps rotate to align feed and discharge lines.

Figure 3:
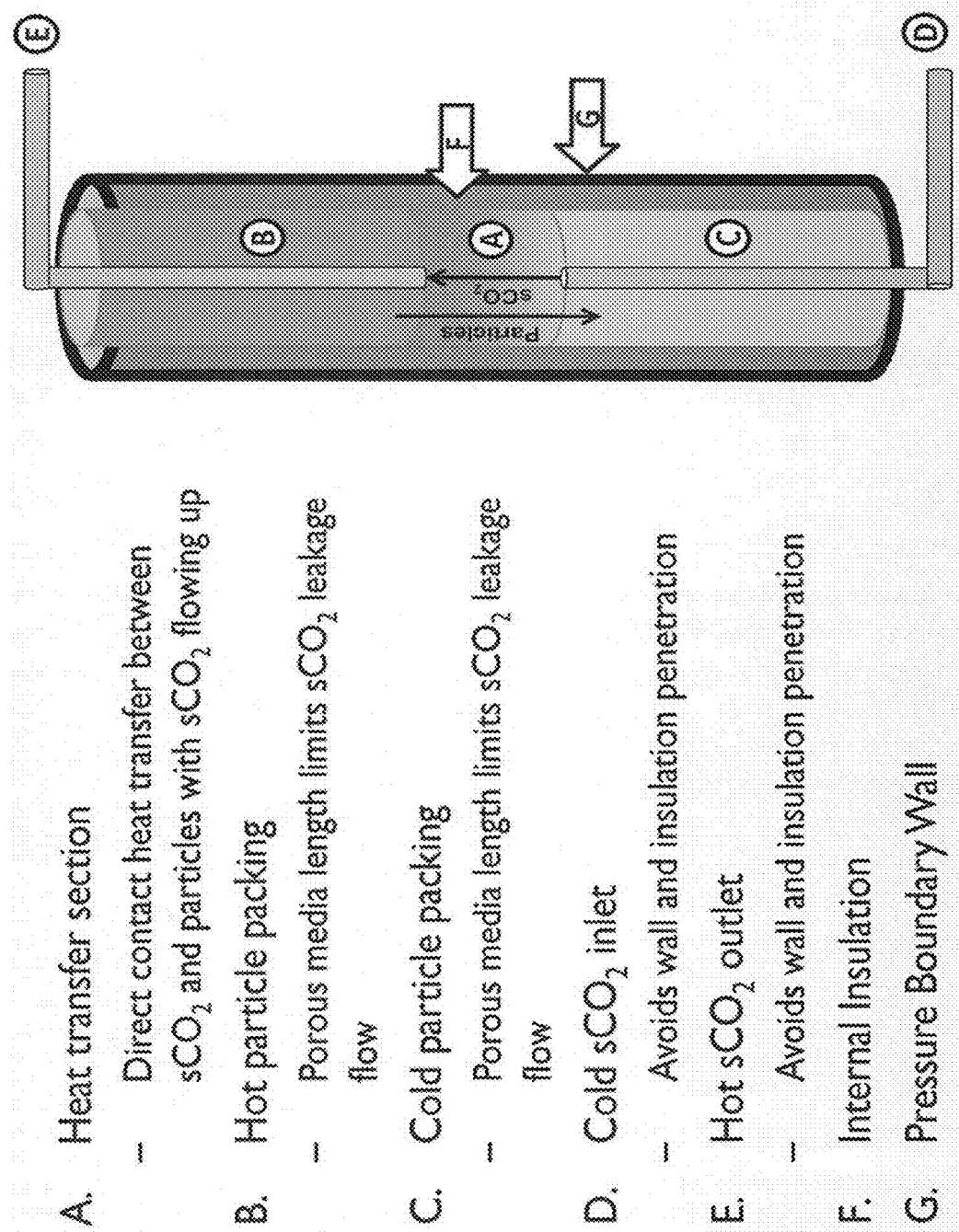
FIG. 3 illustrates another embodiment of a heat exchange system and method according to an embodiment of the disclosure.

FIG. 3 illustrates another method and system according to an embodiment of the disclosure. In this exemplary embodiment, the hot particles are loaded into the top of the heat exchanger and flow via gravity to the bottom of the heat exchanger where they are discharged. A cold or warm fluid is feed from the bottom of the heat exchange via an inlet conduit that travels upward within the particle mass. The fluid then exits the inlet conduit and directly contacts and mixes with the hot particles in a heat transfer section. The heated fluid is then collected by an outlet conduit that exits the top portion of the heat exchanger. The particles surrounding the conduits allows the fluid to be preheated before the contact zone of the heat transfer section and to continue to heat the particles in the outlet conduit. The mixing portion or heat transfer section A allows the hot particles and cold fluid to directly exchange heat. As will be understood by one of ordinary skill in the art, the particle flow controls and devices as well as the fluid controls and devices would be determined based on the application of the heat exchanger.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A heat exchange system, comprising:
a pressure vessel comprising a drum, a first cap, and a second cap, wherein two or more chambers are located within the drum and extend from a first end of the drum to an opposite second end of the drum, wherein the first cap caps the chambers at the first end of the drum and the second cap caps the chambers at the second end of the drum, and wherein the caps include a particle inlet, a particle outlet, a fluid inlet, and a fluid outlet; and
a control system configured to either rotate the drum relative to the caps or to rotate the caps relative to the drum, such that each chamber can rotate between a first position and a second position;
wherein, when said chambers are at the first position, the chambers fluidically connect the particle inlet to the particle outlet, and when said chambers are at the second position, the chambers fluidically connect the fluid inlet to the fluid outlet;
wherein, when one chamber of the two or more chambers is in the first position, another chamber of the two or more chambers is in the second position;
the control system further configured to:
move the chambers into the first position which causes particles at a first particle temperature to enter said chambers through the particle inlet while particles at a second particle temperature exit said chambers through the particle outlet,
move the chambers from the first position to the second position,
introduce a fluid at a first fluid temperature into the chambers in the second position containing the particles at the first particle temperature thereby heating the fluid via direct contact with the particles to a second fluid temperature and pressurizing the pressure vessel and reducing the particle temperature to a second particle temperature, and to then discharge the fluid at the second fluid temperature via the fluid outlet, and
move the chambers from the second position to the first position;
wherein the first particle temperature is greater than the second particle temperature; and
wherein the first fluid temperature is less than the second fluid temperature.

2. The heat exchange system of claim 1, wherein the particles at the first particle temperature are received in the pressure vessel at ambient pressure.

3. The heat exchange system of claim 1, wherein the fluid is supercritical carbon dioxide.

4. The heat exchange system of claim 1, further comprising a turbine in fluid connectivity with the fluid outlet.

5. The heat exchange system of claim 1, further comprising a recuperator in fluid connectivity with the fluid inlet.

6. The heat exchange system of claim 1, further comprising a solar tower in fluid connectivity with the particle inlet and outlet.

7. The heat exchange system of claim 1, wherein the particles move through the pressure vessel via a moving packed bed.

8. The heat exchange system of claim 1, wherein the particles move through the pressure vessel by gravity.

9. A method for using the heat exchange system according to claim 1, the method comprising:
feeding the particles at the first particle temperature into the pressure vessel;
directly contacting the particles and the fluid; and
discharging the particles at the second particle temperature from the pressure vessel.

10. The method of claim 9, wherein the particles at the first particle temperature are received in the pressure vessel at ambient pressure.

11. The method of claim 9, wherein the fluid is supercritical carbon dioxide.

12. The method of claim 9, wherein pressure is released from the pressure vessel before the particles are discharged from the pressure vessel.

13. The method of claim 9, wherein the particles move through the pressure vessel by gravity.

14. The method of claim 9, further comprising: discharging the fluid from the pressure vessel to a turbine.

15. The method of claim 9, further comprising:
heating the particles by concentrated solar power.

16. The method of claim 9, wherein feeding and discharging of the particles and the fluid from the pressure vessel are controlled by the position of the caps.

* * * * *